July 26, 1938.  H. N. COULTER ET AL  2,124,544
VISUAL INDICATING RADIO DIRECTION FINDER
Original Filed Oct. 23, 1935  2 Sheets-Sheet 1

INVENTORS
HOWARD N. COULTER
GERHARD R. FISHER
BY
Robert A. Lavender
ATTORNEY

July 26, 1938.    H. N. COULTER ET AL    2,124,544
VISUAL INDICATING RADIO DIRECTION FINDER
Original Filed Oct. 23, 1935    2 Sheets-Sheet 2

INVENTORS
HOWARD N. COULTER
GERHARD R. FISHER.
BY
*Robert A. Lavender*
ATTORNEY

Patented July 26, 1938

2,124,544

UNITED STATES PATENT OFFICE 2,124,544

VISUAL INDICATING RADIO DIRECTION FINDER

Howard N. Coulter, United States Navy, San Pedro, and Gerhard R. Fisher, Mountain View, Calif.

Application October 23, 1935, Serial No. 46,314

9 Claims. (Cl. 250—11)

(Granted under the act of March 3, 1883, as amended April 30, 1928; 370 O. G. 757)

This invention relates to radio direction finding systems, more particularly to such systems wherein reception of intelligence is accomplished simultaneously with the determination of the direction of the transmitting station.

A specific object of this invention is to provide an essentially automatic system for use on navigable craft whereby the navigator is enabled to keep closely to a predetermined course. It is further possible to ascertain the exact position of a vessel by taking bearings of one or more radio transmitting stations by either rotating a loop antenna or turning the vessel or aircraft provided with a fixed directional antenna.

When applied to aircraft, the system aids in locating landing fields and is of special utility when the navigator is flying over unfamiliar territory. The invention is manifestly of particular utility under conditions of poor visibility.

A further object of this invention is to provide a radio direction finder that requires little or no manipulation by the operator.

A further object of this invention is to provide a radio direction finder with a visual indicator which permits the taking of bearings with more positive accuracy and with more speed, than by means of aural methods.

A still further object of the invention is to provide a system having a directional loop antenna in which by locking the loop in a zero position, the instrument can function as a visual homing indicator.

Another object of the invention is to provide a direction finder in which the equipment permits continuous listening-in to the transmitting station even when taking bearings. The ordinary radio direction finder operates on a minimum or null signal which usually results in blanking out reception of telegraph or speech during the actual taking of a bearing.

The equipment requires no sense indicator, nor any procedure for determining the sense of a bearing, other than to note which direction of rotation of the loop is required to move the visual indicator to the right or left.

Inadvertent taking of a bearing 180 degrees out will cause no delay nor error, as reverse bearings are always exactly 180 degrees in error.

Whereas ordinary direction finder receivers require manipulation of a balancing condenser during the taking of bearings, this equipment requires no balancing condenser. This device possesses visual and aural means for indicating perfect balance in the loop circuit at any time, making it unnecessary to employ the usual means of balancing heretofore used in radio direction finders.

The signal essentially used is picked up by the antenna, and not the loop, the loop signal merely providing a superimposed signal necessary for determining direction. For this reason greater distance ranges can be obtained than with the ordinary direction finder.

An additional important feature is that due to its inherent modulating system, either CW or modulated continuous wave signals can be received at all times without any switching or adjustment.

The device can be utilized by aircraft for the approximate determination of drift due to wind under conditions when the surface of the earth is totally obscured.

This equipment enables the operator to ascertain the presence of "night" or similar effect both visually and aurally, and further to determine intermittently during periods when such effect is generally existent, brief periods when the effect is absent, under which conditions bearings can be taken which can be definitely known to be free of the abnormal error caused by such effect.

This direction finder does not make use of a minimum signal but utilizes the full strength of the signal received from an open antenna at all times. Operating on the maximum signal strength obtained from an open antenna connected to a radio receiver in such a way as to obtain radio bearings, it permits the full use of a signal properly tuned to its maximum, and thus permits the taking of radio bearings even through heavy interference from transmissions on closely adjacent frequencies and through local man-made interference and static.

This direction finder system permits the simultaneous visual observation at two or more locations, of radio direction finder bearings taken by one direction finder, and likewise permits the simultaneous observation at one location of radio direction finder bearings taken by two or more distantly located direction finders.

Another object of this invention is to provide a direction finding system of the character described in which the number of pieces of apparatus required and their weight may be small so as to reduce the weight required to be carried by an airplane.

In this direction finder system the undesirable effects of tuning or detuning the open antenna in relation to the loop antenna are entirely eliminated with the result that detuning of the radio frequency circuits will not affect the radio bearing.

By using a modulated carrier and a special filtered receiver and loop circuit, the direction finder can be kept immune from interference except when such transmission uses exactly the same carrier radio frequency and audio frequency modulation.

Other objects of the invention will be apparent from the following specifications when read in connection with the accompanying drawings wherein.

Figure 1:
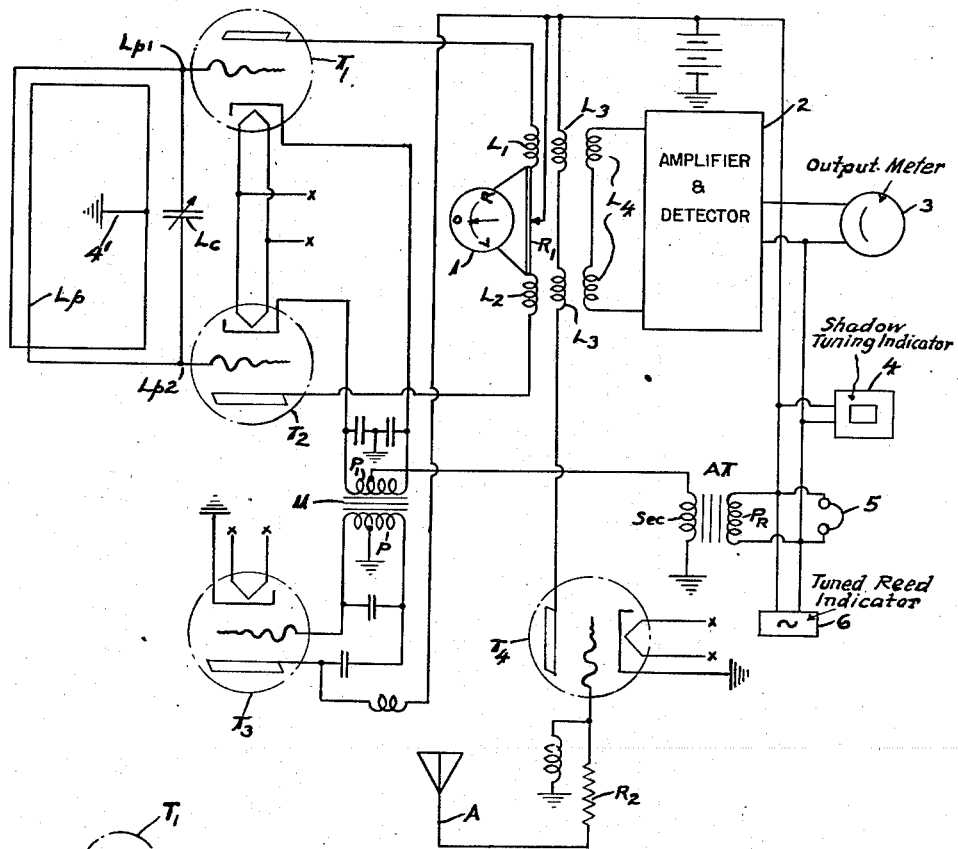
Figure 1 is a schematic wiring diagram of a preferred embodiment of the device.

Referring to Fig. 1, Lp represents the loop antenna, A represents an open non-directive antenna. A radio signal from a distant station is received by antenna A and amplified by means of tube T4. The plate circuit of tube T4 is coupled to the input of radio receiver 2, which consists of several stages of radio frequency amplification, a detector and audio amplifier. The resulting signal is received in the headphones 5. The signal from this open non-directive antenna will never change in strength due to any variation of the directional position of the vessel relative to the transmitter, and regardless of what position the receiver is oriented.

In addition to the above described receiving system, a loop antenna or spaced directional antenna Lp is provided which may be either tuned or untuned, the center of this directional system being grounded at 4', and the leads Lp1 and Lp2, respectively, being connected to the grid circuits of tubes T1 and T2. The plate circuits of T1 and T2 are connected to coils L1 and L2 which in turn are coupled inductively to L3 which represents the plate circuit of T4 and to the input circuit L4 of the receiver 2. L1 and L2 are wound in such a way that they oppose each other. In the plate circuit of tubes T1 and T2 is further incorporated a balancing resistance R1 and a visual indicator 1 having a scale marked "Left—Zero—Right". A local audio frequency oscillator is provided consisting of tube T3, and an oscillating transformer 11 consisting of primary and secondary windings p and p1, the secondary being center tapped. The outside terminals of p1 are connected to the cathodes of tubes T1 and T2, respectively, and the center tap of p1 is connected to the secondary of transformer AT and thence to ground. The primary of AT is connected to the output of receiver 2. Current is received by A, amplified by T4, amplified further, detected and amplified at audio frequency in the receiver 2. The signal may be observed in the telephone head set 5, on a shadow tuning device 4, in a filtered output meter 3 or by means of a tuned reed indicator 6. Energy is also received by means of the loop or directional antenna Lp having a figure 8 characteristic. This loop antenna may be tuned for maximum reception. Perfect symmetry is obtained by grounding at 4 the loop Lp in its exact center. The outside terminals of the loop are connected to the grids of tubes T1 and T2, so that the radio frequency in the loop is amplified and coupled to the receiver 2 in such a way that the radio frequency currents of L1 and L2 neutralize each other. The cathode voltage of tubes T1 and T2 is varied by a local A. C. generator in such a way that while one tube operates on the straight portion of its grid voltage—plate current characteristic curve, the other tube operates on the curved portion, with the result that the amplified R. F. current in L1 will add to the currents received by A at one instant, and subtract therefrom at the next instant. This local generator also has a tendency to modulate any CW signal received by the loop. If the loop is in such a position that no radio frequency current will be received by it, the tubes T1 and T2, and coils L1 and L2 will not transfer any radio frequency energy to L3 or to L4. Incorporated in the cathode circuit of tubes T1 and T2 is a transformer AT. This transformer is connected in such a way that the output voltage is combined with the voltage produced by oscillator T3 and then impressed upon the cathodes of T1 and T2.

The bias of the potential E on the cathodes of T1 and T2 should be selected so that these tubes operate on a curved portion of their grid voltage-plate current characteristic curve, so that during ½ cycle, at frequency V produced by the local oscillator, increased plate current will flow in T1 and very little plate current will flow in tube T2. During the next ½ cycle these conditions will be reversed. R1 is balanced in such a way that these changes in plate current will cause no fluctuation in the indicator 3, and it will remain at zero reading.

Now, when radio frequency energy is received by antenna A, (but not by the loop), after being detected and amplified in receiver 2 and the output voltage thereof impressed with the oscillator voltage upon T1 and T2, no fluctuation of the indicator 1 results. If, however, the loop antenna is receiving R. F. energy at the same time as A does, due to the fact that only T1 or T2 can work at one time, the loop R. F. voltage is at one instant subtracting therefrom, which in turn will result in causing fluctuation of the voltages in AT; or in other words, during ½ cycle the voltage will be large, and during the next ½ cycle, small. This dissymmetry in turn is again transferred back to T1 and T2, resulting in a variation in plate current which will in turn cause the visual indicator 1 to move. By turning the loop antenna the phasing between loop and antenna currents can be materially changed, so that with the loop antenna receiving no voltage from the distant transmitter the visual indicator will read zero, and with the loop turned to the right the indicator will move right, and with the loop turned to the left the indicator will move left. In some installations it is necessary to connect a resistor R2 in series with the antenna A to produce the proper phasing. In general, bad distortion effects are ordinarily incurred as a result of combining tuned antennas with loops. By using a buffer stage as shown any undesirable effects are eliminated.

As above set forth, a voltage component derived from the output of receiver 2 is, through transformer AT, impressed upon the center tap of secondary p1 and thence upon the cathodes of tubes T1 and T2. It is obvious that the component thus impressed upon said cathodes will be at the frequency of the output of receiver 2 and also of oscillator T3, from which it is derived, and that it will have the same phase on both cathodes. However, the polarity of this component does not have a constant relation to that of the voltage in $pl$ but varies in accordance with the direction of deviation of the plane of loop $Lp$ from perpendicular to the path of the signal and hence destroys the balance existing between the outputs of tubes T1 and T2 when the plane of the loop is at right angles to the signal path, causing the indicator 1 to be actuated. It will be noted that tubes T1 and T2 feed into receiver 2 through radio frequency coupling and hence the audio frequency from oscillator T3 is inefficiently transferred and is inconsequential in the output of receiver 2 when the loop voltages are balanced and no radio frequency is being put into receiver 2.

Figure 2:
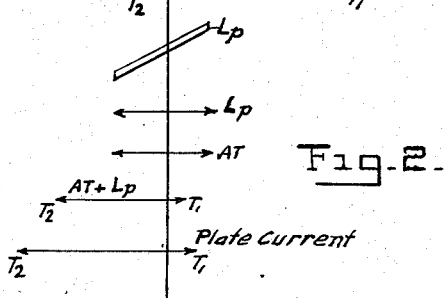
Fig. 2 shows the magnitudes of the various circuit voltages at different cycles of operation.

In Fig. 2 are shown juxtaposed for purpose of comparison, the magnitudes of the various voltages at different points in the circuit during the different cycles of operation. When loop $Lp$ is at right angles to the line from the loop to the source 10 of the received energy, as in the uppermost portion of the figure, all voltages in the loop are equal and opposite and there is no resultant effect on indicator 1. Next below are shown the conditions when $Lp$ is rotated to the right; the voltages from the loop are still equal and opposite, as are those from transformer AT, but the phase relations are such that the resultant of the two gives a small current from T2 and a large current from T1, causing indicator 1 to give an indication "right". The lowermost part of the figure depicts L2 turning to the left, with a resultant greater voltage on T2 than on T1 and a greater plate current from T2, producing the indication "left".

As antenna A always receives a maximum signal on account of its non-directional characteristics, reception of messages is possible even when taking bearings.

Due to the perfect symmetry employed in the circuit, no balancing condenser is required.

The direction finder can be checked at any time for proper operation by observing that when visual indicator 1 reads "zero", the modulation frequency of the local oscillator should not be heard in the phones nor be observed in any of the visual indicators shown in Fig. 1. If these two conditions do not check, there exist two possibilities: (1) a breakdown of electrical circuits in the direction finder, or (2) the existence of "night" or similar effect. During actual tests it was observed that during the presence of night effect the indicator could be kept at zero whereas the modulating frequency would actuate any of the indicators shown in the output of receiver 2; or the effect of the modulating frequency could be kept out of the same indicators, but the visual indicator 1 would continuously swing to the right and left, indicating the presence of night effect. After some time all indicators would again act normally simultaneously and so show that the disturbing influences had subsided, thus enabling the taking of normal bearings.

As antenna A represents an essential part for receiving the signal, it is this antenna which determines the range of the direction finder.

By taking simultaneous readings on the radio direction finder and magnetic compass and observing any change in the visual indicator on the calibrated loop scale, it is possible to approximately determine and make correction for the drift of an aircraft due to the wind.

Local electrical interference, static and man-made interference will affect this direction finder only slightly due to its inherent balancing characteristics.

It is possible to connect as many visual indicators in parallel as necessary to make simultaneous observations at different locations, of bearings being taken.

By means of resistor R1 it is possible to move the pointer of indicator 1 from its center position and in such a way apply any corrections which might be desired.

Figure 3:
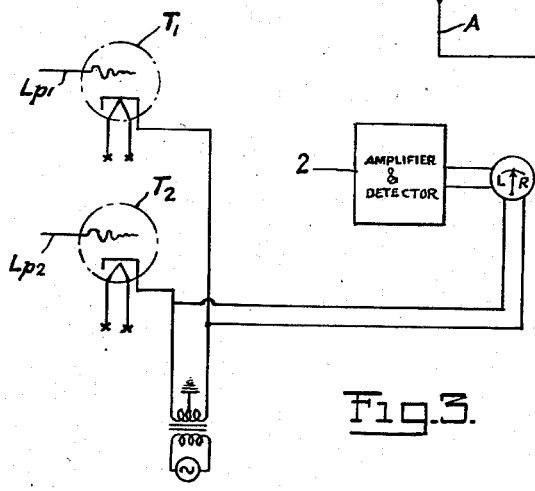
Fig. 3 shows variations in the wiring of the direction finder.

Fig. 3 shows variations in the wiring of the direction finder in which it is not necessary to return the output of receiver 2 to T1, or T2. This is accomplished by using an electrodynamometer. This simplifies the circuit as no transfer of the receiver output energy to the loop circuit is required.

In addition to the indicators provided in the output circuit of receiver 2 it is possible to include a neon tube in the same circuit to determine the silent sector above a radio transmitting station.

Figure 4:
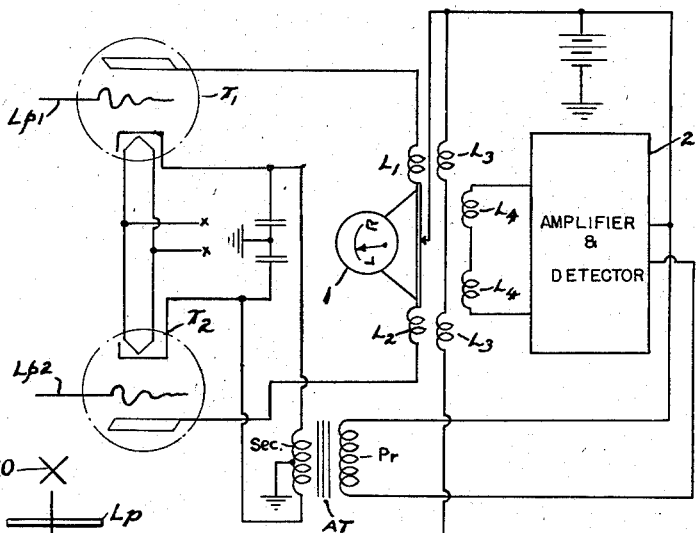
Fig. 4 shows a variation in the wiring whereby the voltage necessary for modulating the loop circuit is derived from a distant transmitter along with the R. F. signal.
Figure 4:
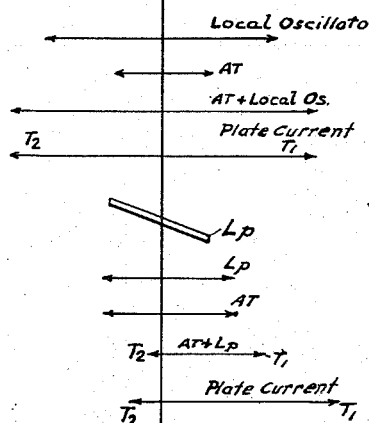

To permit aircraft to "home" despite interference, a variation of the direction finder circuit is shown in Fig. 4. In this system, the local oscillator necessary for modulating the loop circuit is eliminated, and the voltage necessary for this modulation is derived from reception of a modulated continuous wave signal, in which the audio frequency modulation is predetermined, and this received audio frequency energy is passed through a filter circuit in the direction finder. The audio frequency voltage so derived is in turn applied by means of a center-tapped transformer 180° out of phase to the grids of T1 and T2. Thus even if there should be set up radio interference on exactly the same carrier frequency, the aircraft would still be able to "home" unless the carrier frequency was continuously modulated with exactly the same audio frequency modulation.

While this invention is especially adaptable to aircraft it is evident that it also can be used for other purposes.

It is obvious from the preceding description that this invention is not confined specifically to the circuits as shown, but that different means may be employed for combining the signal energies intercepted by the directive and non-directive absorbing means, or that other changes may be made which do not affect the underlying principles of this invention.

The invention disclosed herein may be manufactured and used by or for the Government of the United States without the payment of any royalty thereon.

We claim:

1. In a direction finding system, a pair of amplifying thermionic tubes, a directional loop antenna grounded at its midpoint, connections extending from the terminals of said loop to the grid electrodes of said tubes forming input circuits for said tubes, output circuits including a coil for each of said tubes, said coils being wound in such a way that they oppose each other, means for causing said tubes to alternately operate, one as an efficient amplifier operating on the relatively straight portion of its grid voltage plate current characteristic curve while the other operates on the curved portion, a substantially non-directional antenna, means for amplifying and detecting radio frequency waves, means for impressing on the input circuit of said last means the radio frequency waves amplified by said pair of tubes and the radio frequency waves derived from said non-directional antenna, means for applying a component of potential between the cathode and the grid electrode of each tube of said pair of tubes in phase at the output frequency detected by said detector and means connected in the output circuit of said tubes and responsive to the difference between the value of the average anode current in said pair of tubes for indicating the relative position of said loop antenna with respect to a radio transmitting station transmitting waves received by said antennae.

2. A direction finding system in accordance with claim 1 in which a visual indicator is connected to be energized solely by the output currents from said means for detecting radio frequency waves.

3. A direction finding system in accordance with claim 1 in which an audible signal indicator is connected to said means for detecting radio frequency waves whereby said system may be used for the reception of intelligence simultaneously with its use as a direction finder.

4. A system in accordance with claim 1 in which an indicator for indicating the presence of night effect is connected to be energized by the output from said detector.

5. A system in accordance with claim 1 in which both visual and aural indicators are connected to be energized by the output from said detector.

6. In a direction finding system, a substantially non-directional means for receiving a radio frequency wave from a transmitting station, a second means for receiving a radio frequency wave from the transmitting station, said second means comprising a loop antenna having a grounded midpoint, a pair of thermionic amplifying tubes, means connecting one of the terminals of said loop to the control grid of one of said tubes, means connecting the other of the terminals of said loop to the control grid of the other of said tubes, a radio frequency output circuit for each of said tubes, said output circuits each including the primary winding of a radio frequency transformer, said primary windings being so wound as to oppose each other, a secondary winding coupled to said primary windings and to an additional primary winding, means connecting said additional primary winding to be energized under control of the radio frequency waves received by said non-directional means, an amplifier and detector connected to the secondary winding of said transformer for amplifying the algebraic sum of the waves impressed thereon and detecting the same, means for varying the potential difference between the grid electrode and the cathode of each of the tubes of said pair in phase in accordance with the detected component of current derived from said detector, means including a device having a substantially constant low frequency output for causing said tubes to alternately operate, one as an efficient amplifier operating on the relatively straight portions of its grid-voltage plate current characteristic curve while the other operates on the curved portion, and means for indicating which of said pair of tubes has the greater average output current flowing therein and for indicating the value of the differential current.

7. A system in accordance with claim 6 in which an indicator for indicating the presence of "night" effect is connected to be energized by said detector.

8. In a direction finding system, a pair of heater type thermionic amplifying tubes having cathode, anode and control electrodes, a directional loop antenna connected to the control electrodes of said tubes so as to impress thereon received radio frequency waves of the same frequency and amplitude but of 180° phase difference in the two tubes, a source of modulating frequency connected to the cathodes of said tubes to vary the potential of said cathodes with respect to ground at the same frequency and amplitude but at 180° phase difference in the two tubes, a substantially non-directional antenna, means for amplifying and detecting radio frequency waves, means for simultaneously impressing on the input circuit of said last means the radio frequency waves set up in the output circuits of said pair of tubes and the radio frequency waves from said non-directional antenna, means for varying in phase the potential of both of the cathodes of said pair of tubes with respect to ground at the frequency derived from said detector and an indicating device responsive to the difference of current flow in the output circuits of said pair of tubes.

9. A system in accordance with claim 8 in which an indicator for indicating the presence of "night" effect is connected to be energized by the means for detecting radio frequency waves.

HOWARD N. COULTER.
GERHARD R. FISHER.